(12) United States Patent
Wildman et al.

(10) Patent No.: US 6,270,703 B1
(45) Date of Patent: Aug. 7, 2001

(54) POLYMER FILTERATION APPARATUS AND METHOD OF USE

(75) Inventors: Paul D. Wildman, Saugus; Delano B. Trott, Danvers, both of MA (US)

(73) Assignee: Dynisco Extrusion, Inc., Hickory, NC (US)

( * ) Notice: Subject to any disclaimer, the term of this patent is extended or adjusted under 35 U.S.C. 154(b) by 0 days.

(21) Appl. No.: 09/528,391

(22) Filed: Mar. 20, 2000

Related U.S. Application Data

(63) Continuation-in-part of application No. 09/271,666, filed on Mar. 18, 1999, now Pat. No. 6,168,411.

(51) Int. Cl.[7] .................................................. B29C 45/00
(52) U.S. Cl. ............................ 264/39; 425/197; 425/198; 425/199; 425/559
(58) Field of Search ................................ 264/39; 425/197, 425/198, 199, 559

(56) References Cited

U.S. PATENT DOCUMENTS

| 1,163,740 | 12/1915 | Cohoe . |
| 1,595,470 | 8/1926 | Johnson . |

(List continued on next page.)

FOREIGN PATENT DOCUMENTS

| 2524746 A1 | 12/1976 | (DE) . |
| 2541738 C3 | 3/1977 | (DE) . |
| 4426629A1 | 2/1996 | (DE) . |
| 0172925 | 3/1986 | (EP) . |
| 1272329 | 8/1961 | (FR) . |
| 1553319 | 12/1968 | (FR) . |
| 2324443 | 4/1977 | (FR) . |
| WO 90/03879 | 4/1990 | (WO) . |

*Primary Examiner*—Tim Heitbrink
(74) *Attorney, Agent, or Firm*—Hamilton, Brook, Smith & Reynolds, PC

(57) ABSTRACT

The present invention includes a filtration apparatus for an injection molding machine where the injection molding machine includes a screw housed within a bore for generating molten polymer. A tip member extends axially from the screw. The tip member has radially extending upstream and downstream flanges positioned axially apart from each other. A filter encircles the tip member and is capable of filtering the molten polymer. An annular ring member encircles the tip member and is slidably positioned within the bore between the upstream and downstream flanges. The ring member is capable of sliding between the flanges for directing the molten polymer through the filter or preventing back flow of the molten polymer past the upstream flange. An end stop is positioned within the bore and is capable of engaging and preventing movement of the ring member past the end stop while allowing the downstream flange of the tip member to be translated forwardly therepast to simultaneously space the upstream and downstream flanges apart from the ring member. This allows the molten polymer to bypass the filter for purging contaminants filtered from the molten polymer.

23 Claims, 17 Drawing Sheets

U.S. PATENT DOCUMENTS

| | | |
|---|---|---|
| 2,257,067 | 9/1941 | Parsons . |
| 2,374,468 | 4/1945 | Opel . |
| 2,636,218 | 4/1953 | Orsini . |
| 2,653,351 | 9/1953 | Henning . |
| 2,770,836 | 11/1956 | Hankey . |
| 2,864,126 | 12/1958 | Henning . |
| 2,895,167 | 7/1959 | Paggi . |
| 3,335,461 | 8/1967 | Schwartz . |
| 3,495,299 | 2/1970 | Chazal et al. . |
| 3,578,741 | 5/1971 | Blumer . |
| 3,710,988 | 1/1973 | Moslo .................................. 222/404 |
| 4,077,756 | 3/1978 | Meadors ............................... 425/207 |
| 4,112,516 | 9/1978 | Hotz ....................................... 366/80 |
| 4,174,198 | 11/1979 | Kinoshita ............................. 425/135 |
| 4,177,234 | 12/1979 | Lowry . |
| 4,191,648 | 3/1980 | Kaplan et al. ....................... 210/186 |
| 4,257,901 | 3/1981 | Rapp .................................... 210/791 |
| 4,332,541 | 6/1982 | Anders ................................. 425/197 |
| 4,358,262 | 11/1982 | Herbert ................................ 425/185 |
| 4,434,053 | 2/1984 | Osuna-Diaz ......................... 210/446 |
| 4,477,242 | 10/1984 | Eichlseder et al. .................. 425/207 |
| 4,486,304 | 12/1984 | Neuman et al. ..................... 210/107 |
| 4,511,472 | 4/1985 | Trott .................................... 210/340 |
| 4,512,733 | 4/1985 | Eichlesder et al. .................. 425/207 |
| 4,627,916 | 12/1986 | Dörsam ................................ 210/488 |
| 4,661,249 | 4/1987 | Langley ............................... 210/266 |
| 4,714,422 | 12/1987 | Meeker et al. ....................... 425/204 |
| 4,849,113 | 7/1989 | Hills ..................................... 210/741 |
| 4,966,539 | 10/1990 | Pena .................................... 425/208 |
| 5,122,286 | 6/1992 | Kreyenborg et al. . |
| 5,141,631 | 8/1992 | Whitman .............................. 210/108 |
| 5,151,025 | 9/1992 | Müller .................................. 425/199 |
| 5,246,660 | 9/1993 | Tsutsumi .............................. 264/328 |
| 5,417,866 | 5/1995 | Trott .................................... 210/791 |
| 5,456,828 | 10/1995 | Tersi et al. ........................... 210/184 |
| 5,462,653 | 10/1995 | Hills ....................................... 210/85 |
| 5,507,498 | 4/1996 | Trott ........................................ 277/1 |
| 5,510,030 | 4/1996 | Bacher et al. ....................... 210/397 |
| 5,587,076 | * 12/1996 | Herzog ................................ 425/197 |
| 5,618,423 | 4/1997 | Lin ..................................... 210/360.2 |
| 5,783,223 | 7/1998 | Anderson ............................. 425/185 |
| 6,113,380 | * 9/2000 | Hara .................................... 425/559 |

* cited by examiner

POLYMER FILTERATION APPARATUS AND METHOD OF USE

RELATED APPLICATION

This application is a Continuation-in-Part of PCT application entitled "Polymer Filtration Apparatus", by Paul D. Wildman and Delano B. Trott, filed Mar. 16, 2000, and is a Continuation-in-Part of U.S. patent application Ser. No. 09/271,666, filed Mar. 18, 1999, now U.S. Pat. No. 6,168,411 the entire teachings of which are incorporated herein by reference.

BACKGROUND

Generally, polymer injection molding machines include an elongate barrel with a bore extending therethrough. A powered elongate screw is housed within the bore of the barrel. Rotation of the screw within the bore plasticizes and melts polymer pellets fed into the bore from a hopper. In an injection stroke, forward translation of the screw relative to the bore forces a shot of accumulated molten polymer from the bore for injection into a mold.

In some instances, a filter assembly is positioned at the end of the barrel for filtering contaminants from the molten polymer as the polymer is forced in a shot from the bore by the forward translation of the screw. The filter assembly can include a mechanism which removes contaminated filter elements from the polymer flow path and then repositions clean filter elements back into the flow path. A drawback of such a filter assembly is that filtering the molten polymer during the injection stroke of the screw results in a very high flow rate of polymer through the filter assembly which increases resistance to the injection stroke as well as the time required to perform the injection stroke. In addition, the filter elements usually require handling by the machine operator, which, depending upon the design of the filter assembly, can be unwieldly. Previous attempts to position a purgable filter within the barrel to filter polymer prior to the injection stroke in order to avoid these problems require special channels formed within the barrel for purging contaminants from the filter. Such channels can be difficult to manufacture.

SUMMARY OF THE INVENTION

The present invention includes a filtration apparatus for an injection molding machine where the injection molding machine includes a screw housed within a bore for generating molten polymer. The filtration apparatus filters molten polymer prior to but not during the injection stroke of the screw and does not require any changing of filter elements or special channels in the barrel, thereby avoiding the problems discussed above.

In the present invention filtration apparatus, a tip member extends axially from the screw within the bore. The tip member has radially extending upstream and downstream flanges positioned axially apart from each other. A filter encircles the tip member for filtering contaminants from the molten polymer. An annular ring member encircles the tip member and is slidably positioned within the bore between the upstream and downstream flanges. The ring member is capable of slidably engaging the downstream flange of the tip member for directing the molten polymer through the filter which then accumulates within the bore. The ring member is also capable of slidably engaging the upstream flange for preventing back flow of the molten polymer past the upstream flange when forcing a shot of accumulated molten polymer from the bore with forward translation of the screw. An end stop is positioned within the bore and is capable of engaging and preventing movement of the ring member past the end stop while allowing the downstream flange of the tip member to be translated forwardly therepast to simultaneously space the upstream and downstream flanges apart from the ring member. This allows the molten polymer to bypass the filter for purging contaminants filtered from the molten polymer.

In preferred embodiments, the tip member includes an intermediate shaft portion between the upstream and downstream flanges. A series of first recesses encircle the intermediate shaft portion and extend longitudinally along the intermediate shaft portion between the flanges. A series of second recesses also encircle the intermediate shaft portion starting from a position spaced from the upstream flange and extending longitudinally along the intermediate shaft portion and then through the downstream flange. The first and second recesses are arranged on the intermediate shaft portion in an alternating fashion. Each first recess is laterally separated from a second recess by a ridge. Each ridge includes a series of recesses or slots formed through an outer edge of the ridge in a comb-like fashion which forms a filter element of the filter for filtering molten polymer flowing from the first recesses into the second recesses. The downstream flange is generally conical shaped and becomes narrower moving in the downstream direction. The upstream flange is formed by an annular member mounted at an upstream end of the intermediate shaft portion. The end stop includes an annular ring extending into the bore and the tip member is mounted to the screw.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
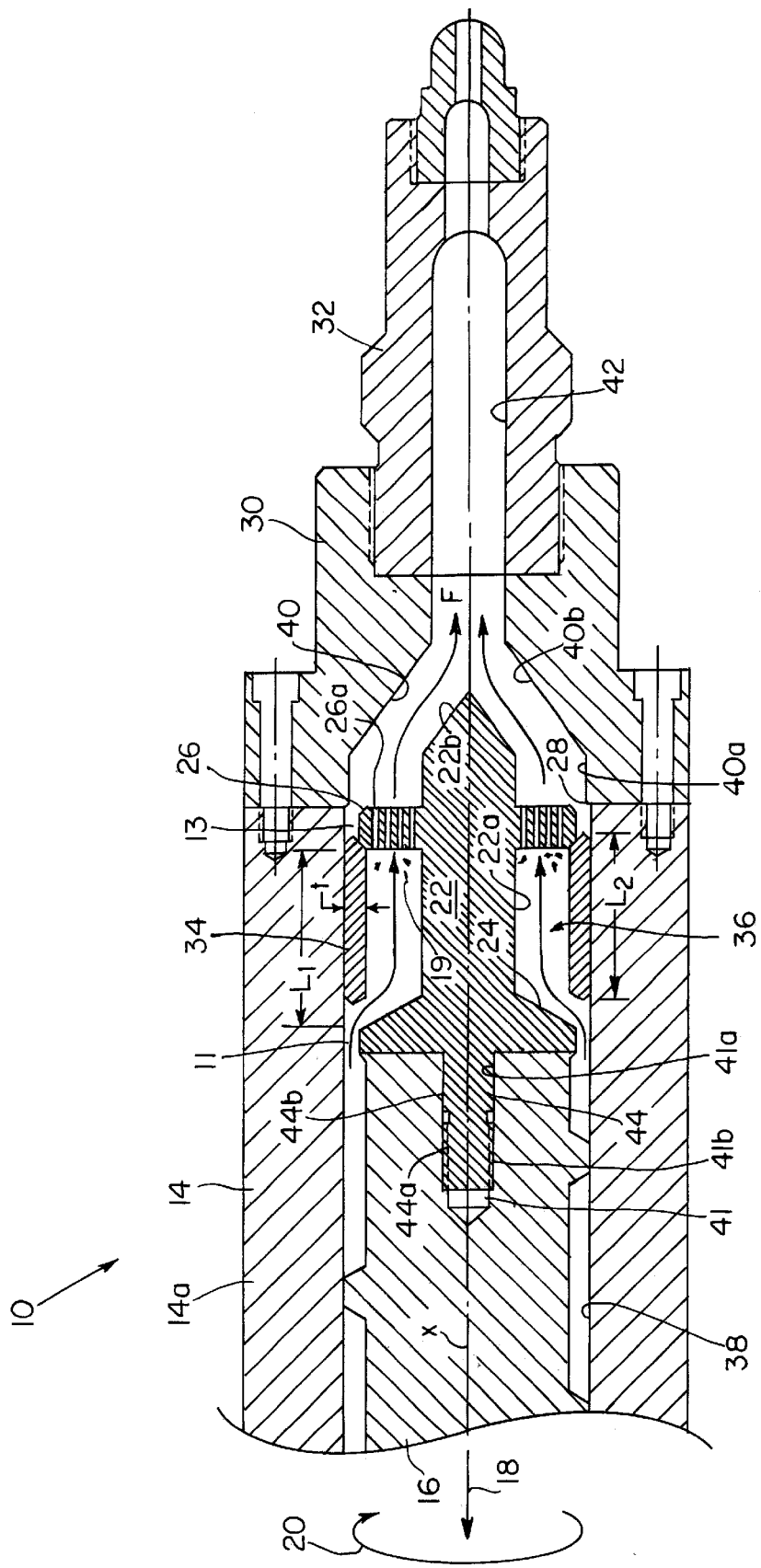
FIG. 1 is a side sectional view of the distal end of an injection molding machine including the present polymer invention filtration apparatus.

Referring to FIGS. 1, 2, 3 and 4, polymer filtration apparatus 10 is incorporated within the distal end of an injection molding machine 14. Injection molding machine 14 includes a powered elongate screw 16 housed within a constant diameter bore 38 extending through a barrel 14a. Screw 16 is rotatable in the direction of arrow 20 for plasticizing and melting polymer pellets fed into bore 38. Screw 16 is also translatable in the directions of arrows 18 and 46 (FIG. 3) for accumulating molten polymer within bore 38 and for forcing a single shot of molten polymer from bore 38 in an injection stroke into a mold (not shown). An end cap 30 is mounted to the end of barrel 14a with screws and has a narrowing bore 40 in communication with bore 38. Bore 40 has a constant diameter portion 40a at the upstream end which extends into a tapering portion 40b. The constant diameter portion 40a at the upstream end has a diameter that is slightly less than the diameter of bore 38, thereby forming an annular shoulder 28 between bores 38 and 40. A nozzle 32 is secured to the downstream end of end cap 30. Nozzle 32 has a nozzle opening 42 in communication with bore 40. Nozzle 32 engages with the mold for directing polymer into the mold.

A tip member 22 is secured to the distal end of screw 16. Tip member 22 has a mounting shaft 44 which engages a hole 41 at the distal end of screw 16 for securing tip member 22 to the distal end of screw 16. Mounting shaft 44 has a proximal smooth diameter portion 44b and a distal threaded portion 44a. The smooth diameter portion 44b of shaft 44 mates with a smooth bore portion 41a of hole 41 for locating tip member 22 concentrically relative to axis X of screw 16 while the threaded portion 44a of shaft 44 engages threaded hole portion 41b of hole 41 for securing tip member 22 thereon. A circular upstream flange 24 extends from mounting shaft 44 and abuts the distal end of screw 16 when tip member 22 is secured thereon. A circular downstream flange 26 is axially spaced apart from upstream flange 24 by an intermediate shaft portion 22a extending therebetween. The opposing faces of flanges 24 and 26 are separated by a distance $L_1$. The diameters of flanges 24 and 26 are smaller than bore 38 to form respective annular gaps or passages 11 and 13 therebetween. In addition, the diameter of downstream flange 26 is less than the diameter of constant diameter portion 40a of bore 40 for allowing flange 26 to extend therein, as discussed later. The diameters of flanges 24 and 26 are greater than the diameter of intermediate shaft portion 22a so that the flanges 24/26, intermediate shaft portion 22a and ring member 34 (discussed below), define an annular region 36 therebetween. Downstream flange 26 has a series of filter holes 26a extending axially therethrough parallel to the axis X of screw 16. The series of filter holes 26a forms a filter for filtering contaminants 19 from molten polymer forced downstream by the rotation of screw 16. Tip 22b of tip member 22 extends from downstream flange 26 and tapers to a point to promote the smooth flow of polymer thereover. Tip member 22 is preferably formed in two pieces with intermediate shaft portion 22a being secured to upstream flange 24 by threaded portions, but alternatively, can be one piece or more than two pieces.

An annular ring member 34 is slidably positioned within bore 38 and is positioned between the upstream 24 and downstream 26 flanges of tip member 22. Ring member 34 has a sliding fit with the inner surfaces of bore 38 and has an axial length $L_2$ that is slightly less than the axial distance $L_1$ between flanges 24 and 26. The annular thickness t of ring member 34 is greater that the annular width of annular gaps 11/13 between flanges 24/26 and bore 38. This allows ring member 34 to act as a valve by sliding within bore 38 between flanges 24 and 26 to blocking either annular gap 11 or 13. The upstream and downstream surfaces of ring member 34, as well as the mating surfaces of flanges 24/26 are shaped to form sealing surfaces therebetween when engaged.

Tip member 22 and ring member 34 are preferably made of tool steel but alternatively, can be made of other suitable hardened steels. In addition, although the downstream surfaces of flange 24 and tip 22b are preferably angled to promote the smooth flow of polymer thereover, alternatively, the downstream surfaces of flange 24 and tip 22b can be perpendicular to axis X. Furthermore, filter holes 26a are preferably about 500 microns in diameter but can vary between 200 microns and 5,000 microns depending upon the application at hand.

Figure 2:
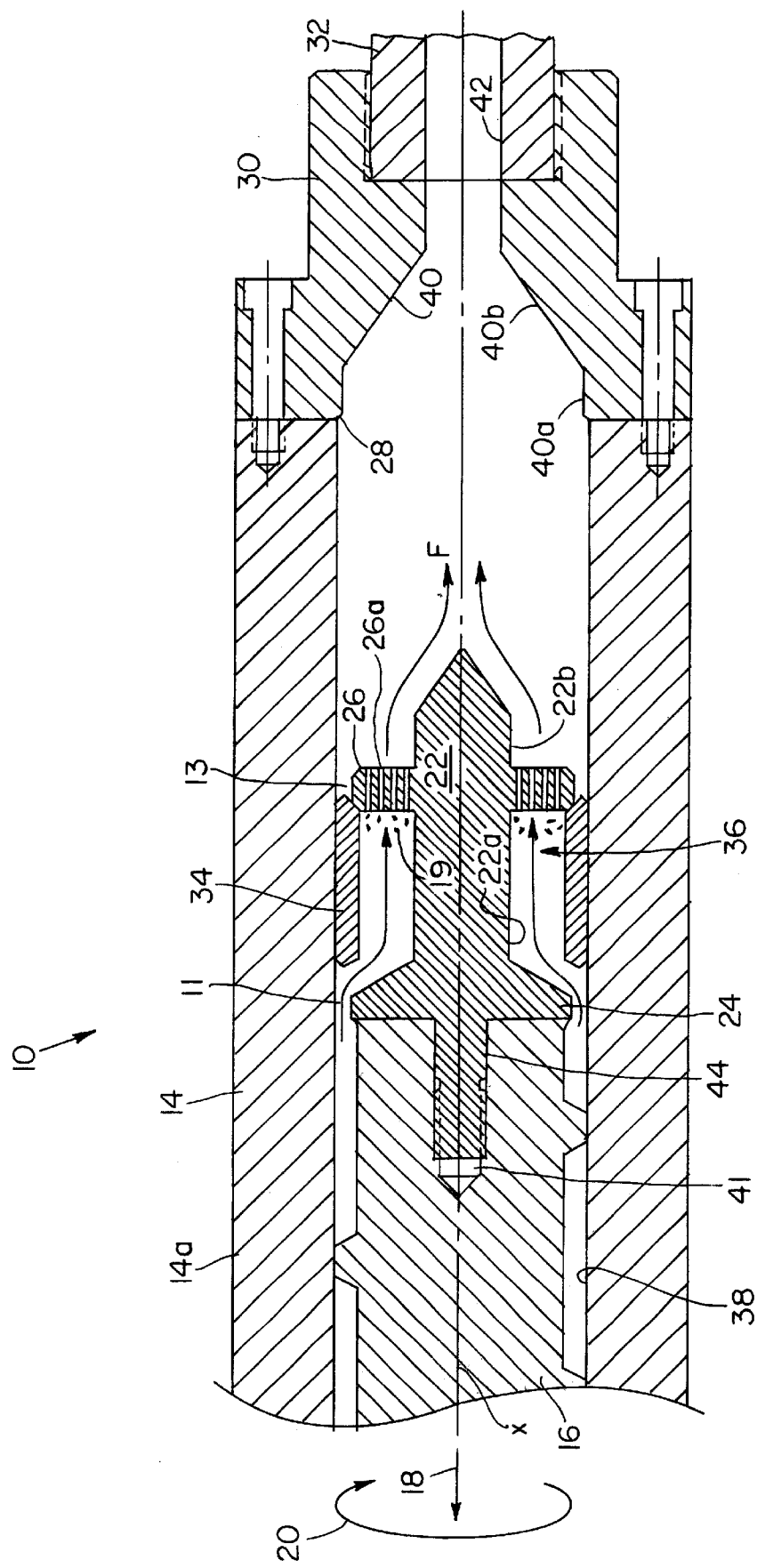
FIG. 2 is a side sectional view of the injection molding machine and filtration apparatus of FIG. 1 in which the screw is translated backward to accumulate molten polymer in front of the screw.

Referring to FIGS. 1 and 2, a description of the operation of filtration apparatus 10 now follows. Screw 16 of injection molding machine 14 is rotated in the direction of arrow 20 to plasticize and melt polymer pellets fed into barrel 14a. As the polymer melt is delivered to the end of the bore, screw 16 is translated backwardly in the direction of arrow 18 from the position of FIG. 1 to that of FIG. 2 to allow molten polymer to accumulate downstream from screw 16.

The rotation of screw 16 forces molten polymer against the upstream surfaces of ring member 34 which in combination with backward movement of screw 16, moves ring member 34 against downstream flange 26, thereby blocking and sealing the annular gap 13 around flange 26. As a result, annular gap 13 is isolated from annular region 36 so that molten polymer forced by the rotation of screw 16 is directed through the filter holes 26a of downstream flange 26 to remove contaminants 19 from the polymer. The contaminants 19 accumulate within the annular region 36 behind downstream flange 26. The flow path of the molten polymer generated by screw 16, as indicated by arrows F, axially passes upstream flange 24 through annular gap 11 and flows radially inwardly into the annular region 36. Once in annular region 36, the molten polymer flows axially towards and through the filter holes 26a of downstream flange 26, and then over tip 22b. The filtered molten polymer accumulates downstream from screw 16 and tip member 22 within bore 38, passage 40 and nozzle opening 42.

Figure 3:
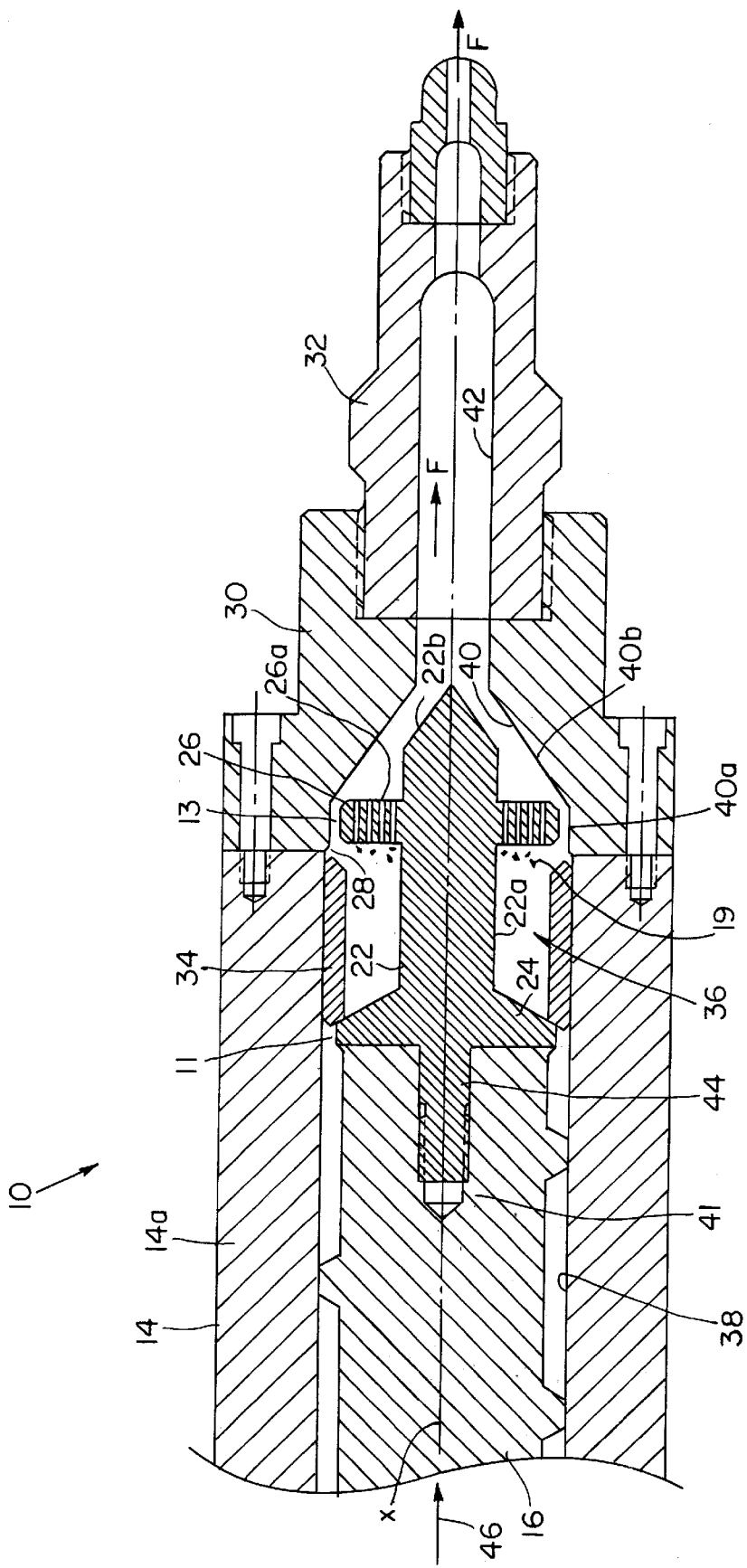
FIG. 3 is a side sectional view of the injection molding machine and the filtration apparatus of FIG. 1 in which the screw is translated forward in a polymer injection stroke.

Referring to FIG. 3, when the desired amount of filtered molten polymer is accumulated downstream or in front of screw 16, the rotation of screw 16 is stopped and screw 16 is translated forward in an injection stroke in the direction of arrow 46. This forces a shot of molten polymer through bore 38, through bore 40, through nozzle opening 42, and into the awaiting mold, as indicated by arrows F. FIG. 3 depicts screw 16 in the forward position at the end of the injection stroke.

When screw 16 is translated forward, the combination of the forward movement of screw 16 and the back pressure of the molten polymer downstream from ring member 34, forces ring member 34 to slide up against upstream flange 24, thereby blocking and sealing the annular gap 11 surrounding flange 24. This prevents the backflow of polymer past upstream flange 24 during the injection stroke. Typically, the contaminants 19 remain in annular region 36 behind downstream flange 26 during the injection stroke. After the injection stroke is finished, the screw 16 is again rotated in the direction of arrow 20 and translated backwardly in the direction of arrow 18, as shown in FIG. 1, in order to accumulate more filtered molten polymer for another injection stroke.

Figure 4:
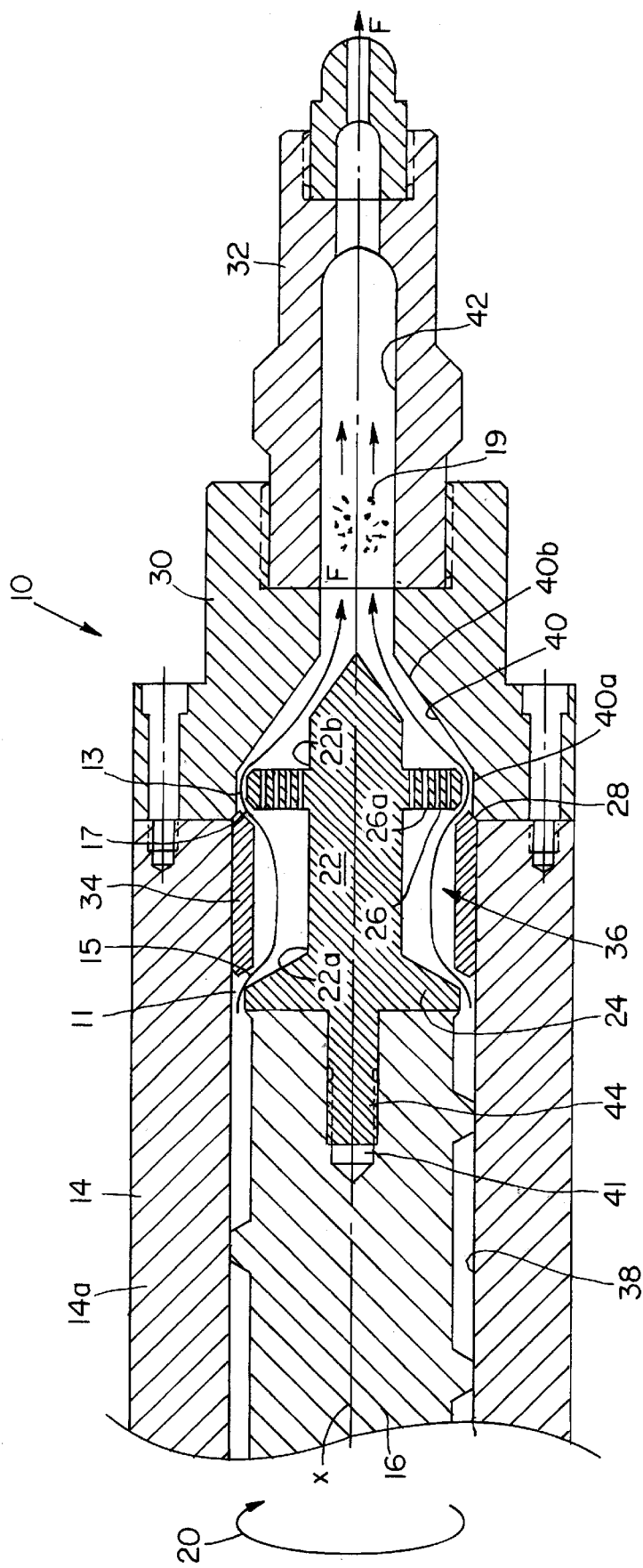
FIG. 4 is a side sectional view of the injection molding machine and the filtration apparatus of FIG. 1 in which the screw is positioned forward for purging contaminants from the filter.
Figures 5, 6:
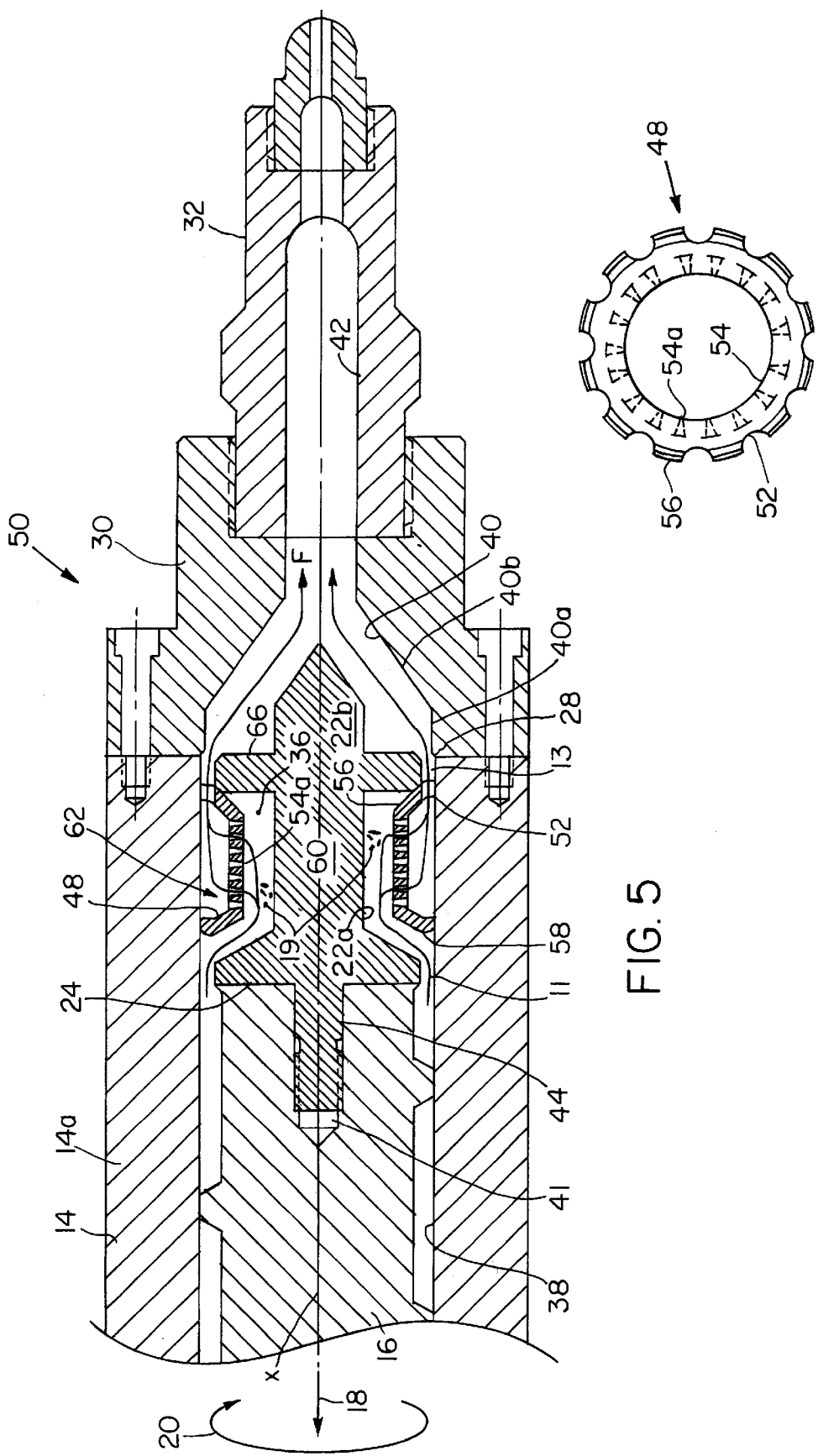
FIG. 5 is a side sectional view of the distal end of an injection molding machine including another preferred polymer filtration apparatus.
FIG. 6 is a front view of the ring member of FIG. 5.

Referring to FIG. 4, during normal use, contaminants 19 gradually build up within annular region 36 behind downstream flange 26. Typically, the contaminants 19 require purging only once or twice a day. Purging of the contaminants 19 is accomplished by translating screw 16 forwardly as in an injection stroke and additionally rotating screw 16 in the direction of arrow 20. Downstream flange 26 is positioned slightly past shoulder 28 within the constant diameter portion 40a of end cap 30. The flow of molten polymer forces ring member 34 forward against shoulder 28. Shoulder 28 acts as an end stop which prevents further travel of ring member 34 downstream of shoulder 28. Preferably, downstream flange 26 is positioned past shoulder 28 a distance that is about $(L_1-L_2)/2$, where $L_1$ is the distance between flanges 24/26 and $L_2$ is the axial length of ring member 34. This positions ring member 34 midway between flanges 24 and 26. As a result, there is a gap or passage 15 between the upstream flange 24 and ring member 34, and a gap or passage 17 between the downstream flange 26 and ring member 34. Consequently, molten polymer can flow around tip member 22 to flush out or purge contaminants 19 captured within annular region 36 behind downstream flange 26 for discharge through nozzle 32. The flow path of the molten polymer as indicated by arrows F, axially passes upstream flange 24 through gap 11 and flows radially inwardly into annular region 36 through gap 15. After flowing axially through annular region 36, the polymer flows radially outwardly through gap 17 and axially passes flange 26 through gap 13. The polymer then flows over tip 22b, through bore 40, and out through nozzle opening 42 of nozzle 32. Once the contaminants 19 have been purged, injection molding machine 14 is again ready for operation as depicted in FIG. 1.

The operation of filtration apparatus 10 does not require any handling or changing of filter elements by the operator and the injection molding machine 14 can be programmed to automatically purge the contaminants 19 on a timed basis or when the pressure within barrel 14a exceeds a predetermined level. In addition, since the molten polymer is filtered while the molten polymer is accumulating within bore 38, instead of during the injection stroke of screw 16, the screw 16 encounters less resistance during the injection stroke and is able to move forwardly more quickly. This allows quicker injection of the molten polymer into the mold which increases the speed and capacity of the injection molding machine 14. The present invention polymer filtration apparatus 10 does not require any special passages, recesses or channels formed in the barrel 14a or the bore 38. As a result, polymer filtration apparatus 10 can be incorporated into most existing injection molding machines by the installation of a tip member 22, ring member 34, end cap 30 and nozzle 32.

Referring to FIGS. 5, 6, 7 and 8, filtration apparatus 50 differs from filtration apparatus 10 in that tip member 60 has a solid downstream flange 66. In addition, ring member 48 has a radial wall 54 with opposing upstream 58 and downstream 56 walls connected to opposite ends thereof. Radial wall 54 extends concentrically around axis X while the upstream 58 and downstream 56 walls extend radially outwardly from radial wall 54. Radial wall 54 has a series of filter holes 54a extending radially therethrough. Downstream wall 56 includes a series of arched passages 52 extending axially therethrough (FIG. 6) along the outer radial edge of downstream wall 56. Walls 58, 56 and 54 define the ends and inner perimeter of an annular region 62. The outer perimeter of annular region 62 is defined by bore 38.

In the operation of filtration apparatus 50 (FIG. 5), when screw 16 is rotated in the direction of arrow 20 to plasticize polymer pellets within bore 38 and translated backwardly in the direction of arrow 18 to accumulate molten polymer within bore 38, the downstream wall 56 of ring member 48 is forced against downstream flange 66. This isolates annular region 36 from annular gap 13 to direct molten polymer through the filter holes 54a in ring member 48. The filter holes 54a remove contaminants 19 from the polymer. The contaminants 19 accumulate within annular region 36 behind downstream flange 66 and radial wall 54. The flow path of the molten polymer as indicated by arrows F, axially passes upstream flange 24 through annular gap 11 and flows radially inwardly into annular region 36. Once in annular region 36, the molten polymer flows radially outwardly into the annular region of ring member 48 through the filter holes 54a in radial wall 54. The polymer then flows axially towards and through the openings 52 in downstream wall 56, past downstream flange 66 through annular gap 13, and over tip 22b.

Figure 7:
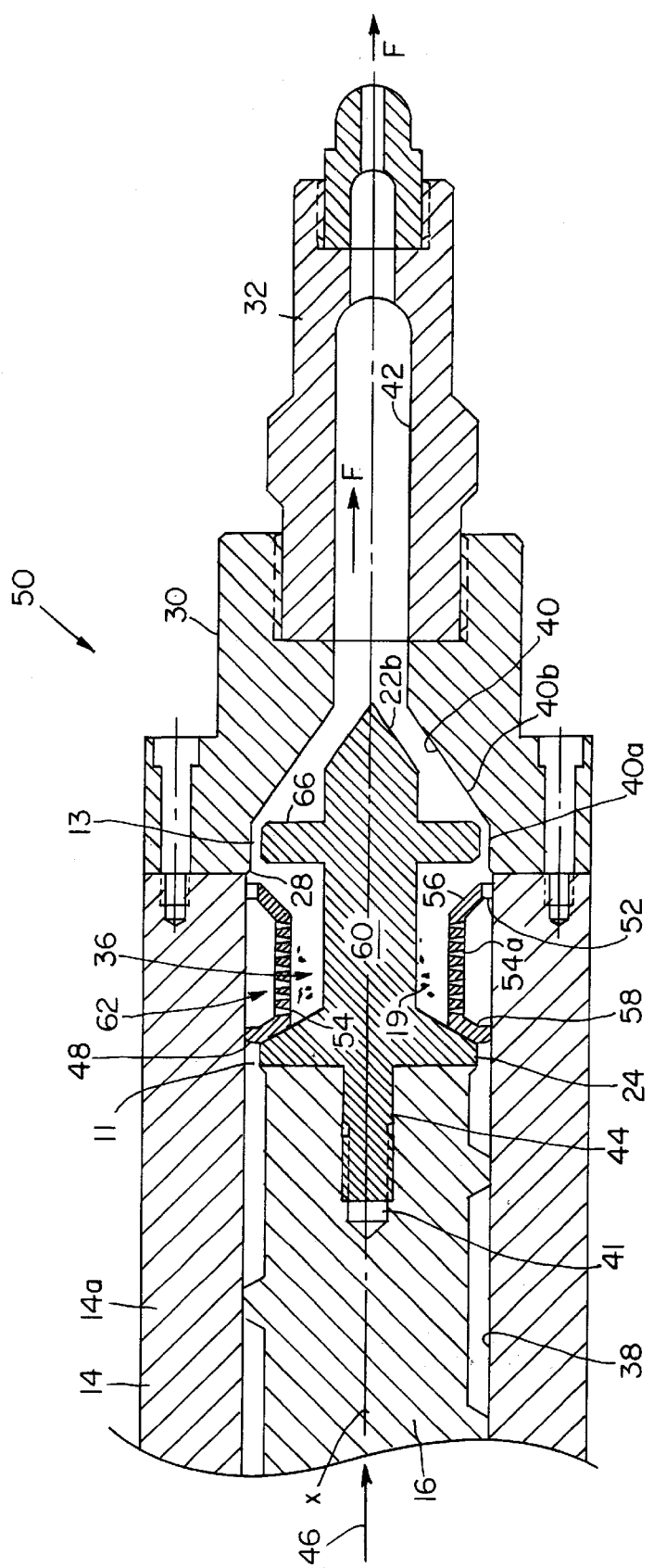
FIG. 7 is a side sectional view of the injection molding machine and filtration apparatus of FIG. 5 with the screw translated forward in a polymer injection stroke.

Referring to FIG. 7, when screw 16 is translated in the forward injection stroke for injecting a shot of molten polymer from bore 38 into a mold, as indicated by arrows F, the upstream wall 58 of ring member 48 is forced against upstream flange 24, thereby sealing annular gap 11 and preventing the backflow of molten polymer past flange 24.

Figure 8:
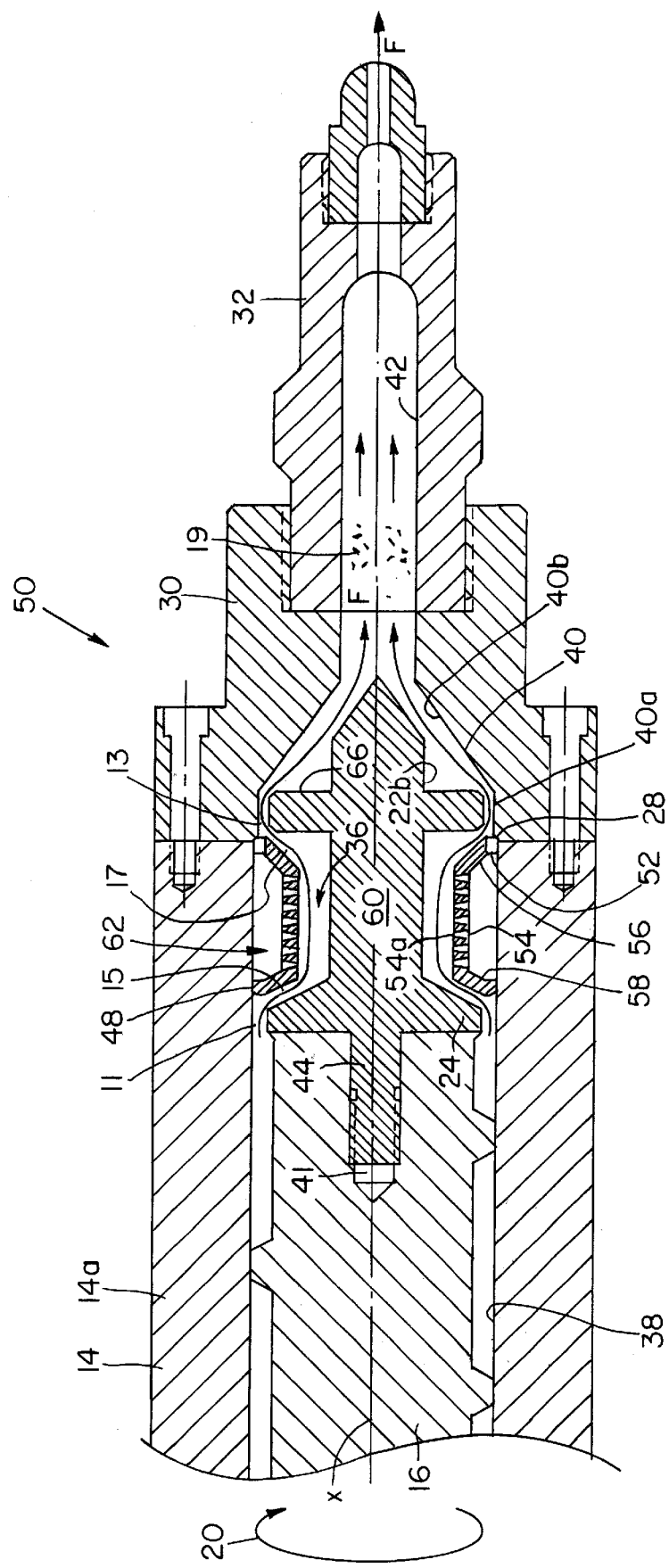
FIG. 8 is a side sectional view of the injection molding machine and filtration apparatus of FIG. 5 in which the screw is positioned forward for purging contaminants from the filter.

Referring to FIG. 8, when the purging of contaminants 19 from annular region 36 is necessary, screw 16 is translated forward to position downstream flange 66 within constant diameter portion 40a and past shoulder 28 in a similar manner as shown in FIG. 4. This positions ring member 48 midway between flanges 24 and 66. As a result, molten polymer flows around tip member 60 to purge contaminants 19 captured within annular region 36 behind radial wall 54 and downstream flange 66 for discharge through nozzle 32. The flow path of the molten polymer as indicated by arrows F, axially passes upstream flange 24 through gap 11 and flows radially inwardly into annular region 36 through gap 15. The molten polymer flows axially through annular region 36 and then radially outwardly through gap 17. The polymer then flows axially past downstream flange 66 through gap 13, over tip 22b, through bore 40, and out through nozzle opening 42 of nozzle 32.

Figure 9:
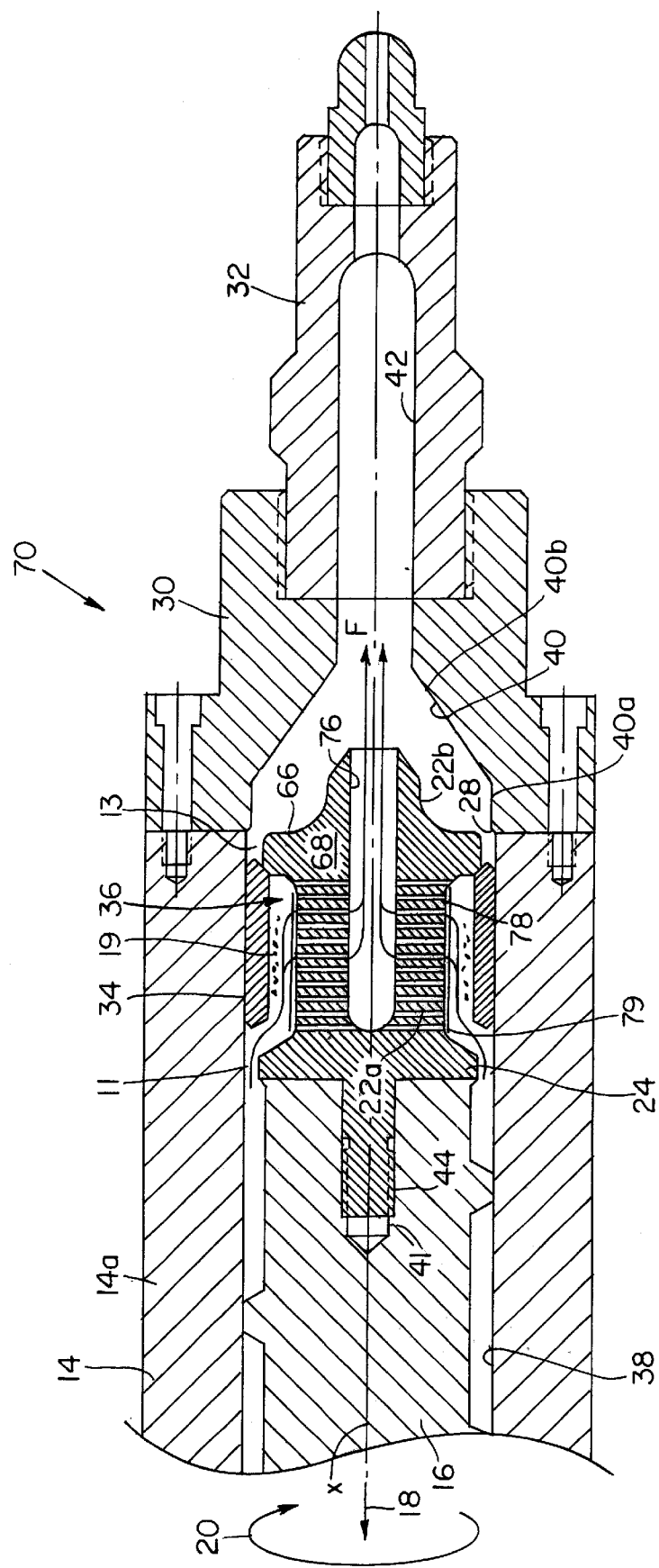
FIG. 9 is a side sectional view of the distal end of an injection molding machine including yet another preferred polymer filtration apparatus.
Figure 10:
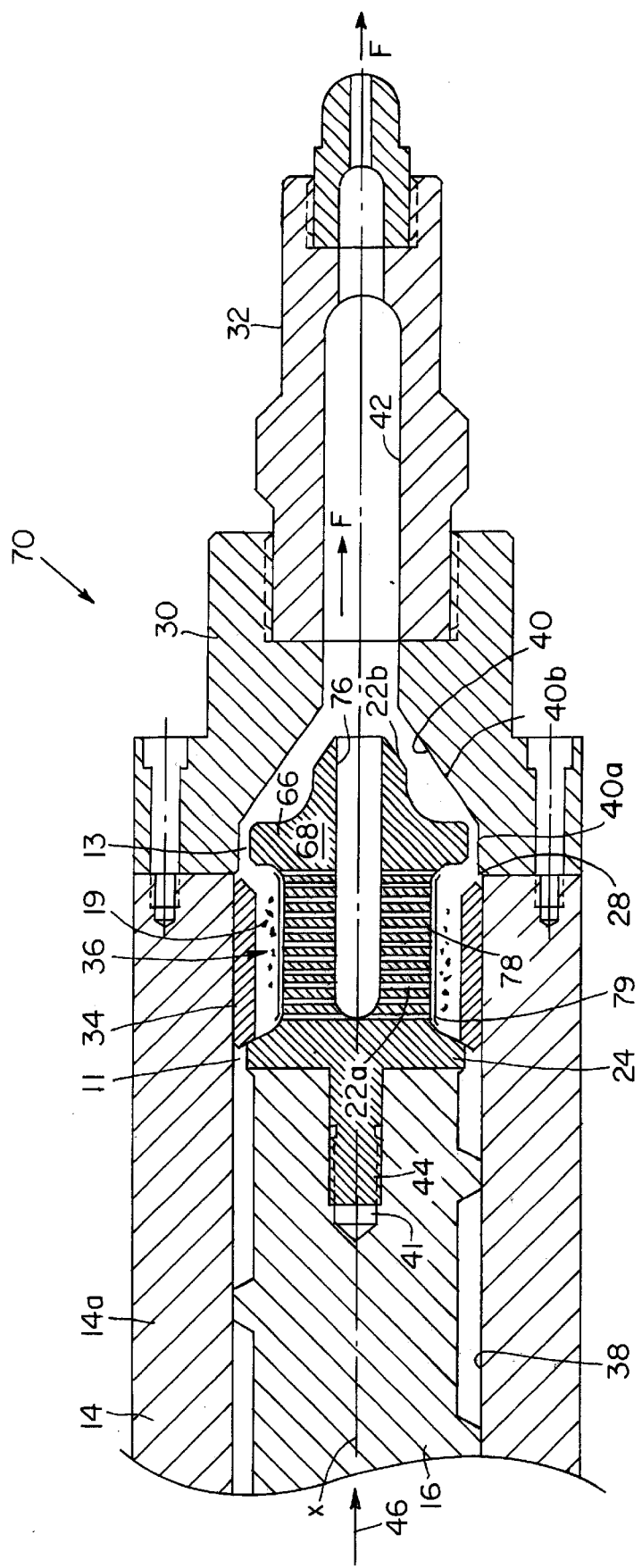
FIG. 10 is a side sectional view of the injection molding machine and filtration apparatus of FIG. 9 with the screw translated forward in a polymer injection stroke.
Figure 11:
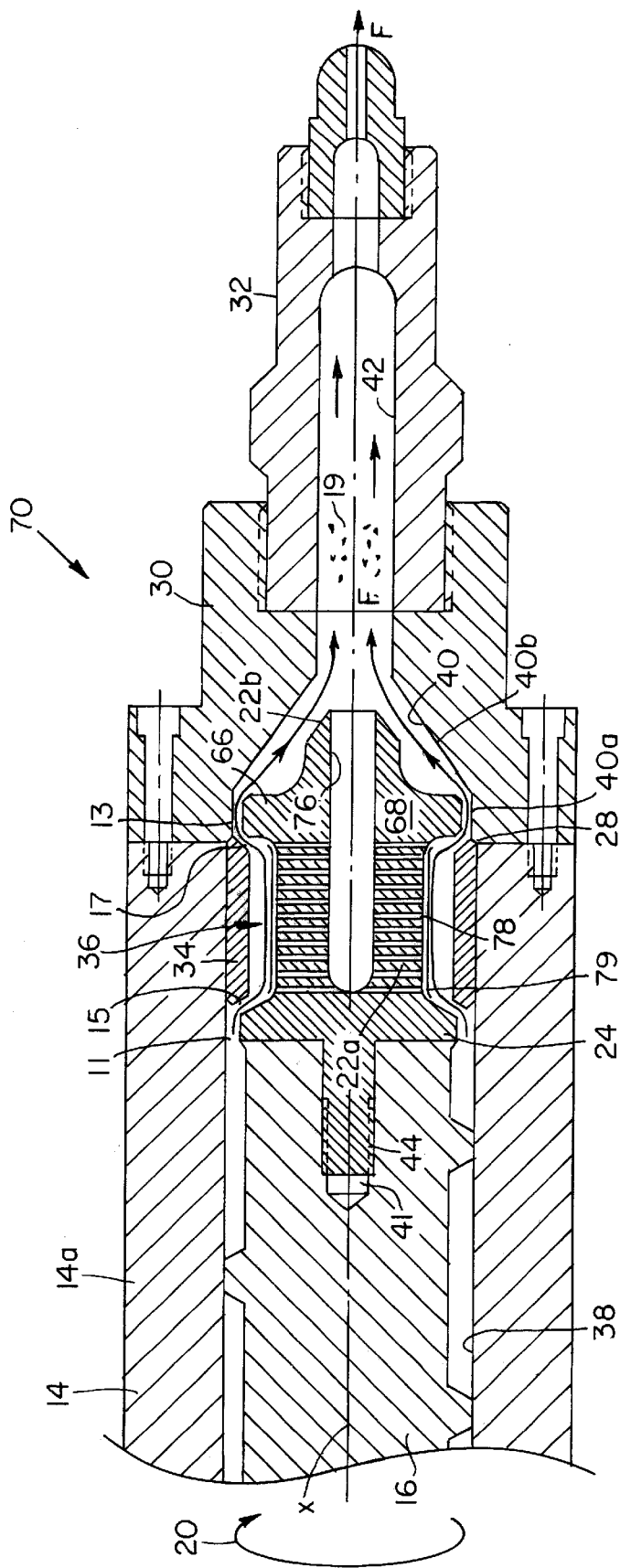
FIG. 11 is a side sectional view of the injection molding machine and filtration apparatus of FIG. 9 with the screw positioned forward for purging contaminants from the filter.
Figures 12, 13:
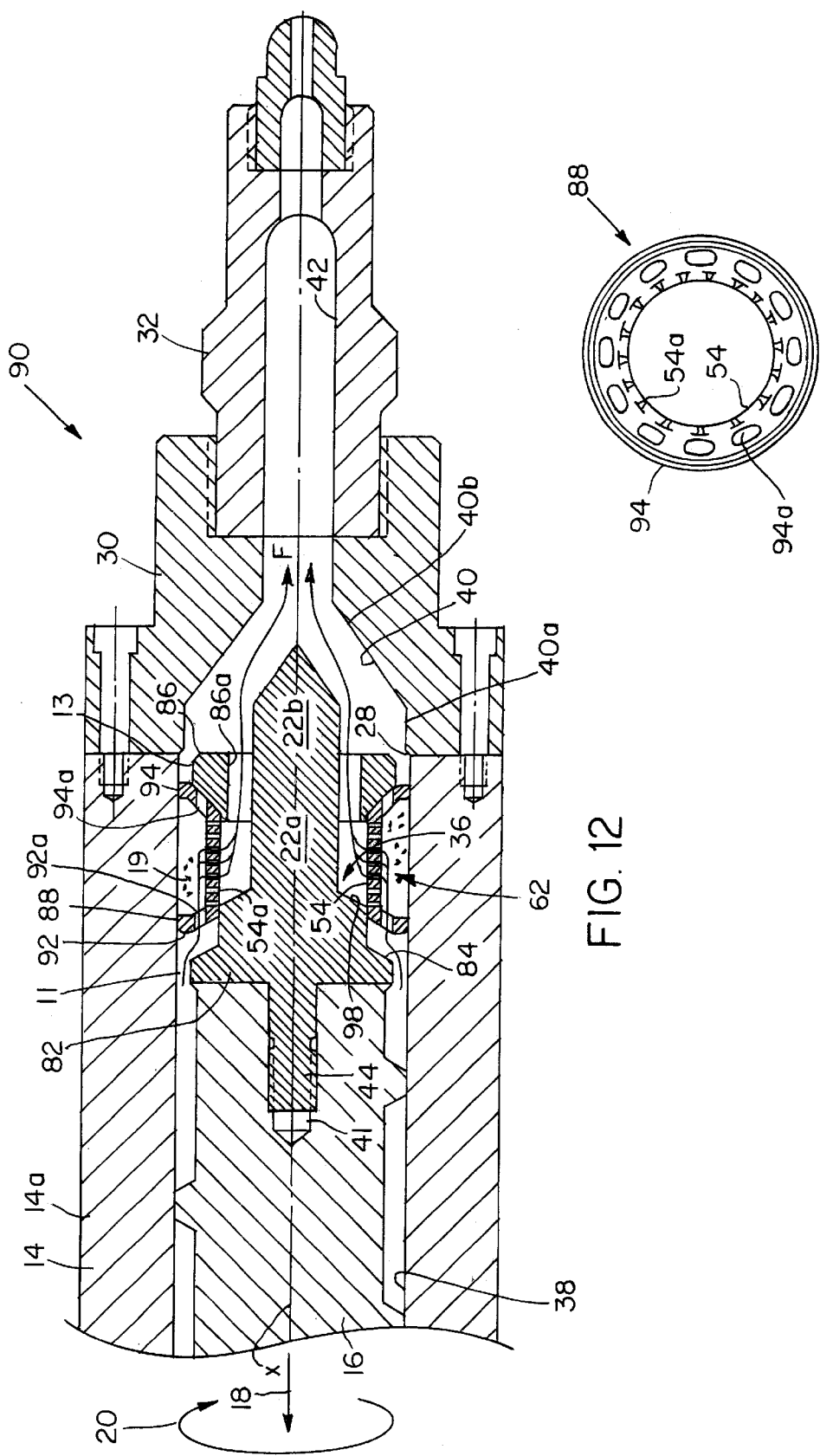
FIG. 12 is a side sectional view of the distal end of an injection molding machine including still another preferred polymer filtration apparatus.
FIG. 13 is a front view of the ring member of FIG. 12.

Referring to FIGS. 9, 10 and 11, filtration apparatus 70 differs from filtration apparatus 10 in that tip member 68 has a solid downstream flange 66 and a central bore 76 extending outwardly through tip 22b. A series of filter holes 78 extend radially inwardly into intermediate shaft portion 22a to central bore 76.

In the operation of filtration apparatus 70 (FIG. 9), when screw 16 is rotated in the direction of arrow 20 to plasticize polymer pellets within bore 38 and translated backwardly in the direction of arrow 18 to accumulate molten polymer within bore 38, the flow of molten polymer forces ring member 34 against downstream flange 66. This seals annular gap 13 and directs the molten polymer through filter holes 78 for removing contaminants 19. The contaminants 19 accumulate within annular region 36 behind downstream flange 66 and filter holes 78. The flow path of the molten polymer as indicated by arrows F, axially passes upstream flange 24 through annular gap 11 and flows radially inwardly into annular region 36. The polymer then flows radially inwardly through filter holes 78 and axially out through bore 76.

Referring to FIG. 10, when screw 16 is translated in the forward injection stroke for injecting a shot of molten polymer from bore 38 into a mold, as indicated by arrows F, ring member 34 is forced against upstream flange 24, thereby sealing annular gap 11 and preventing the backflow of molten polymer past flange 24.

Referring to FIG. 11, when the purging of contaminants 19 from annular region 36 is necessary, screw 16 is translated forward to position downstream flange 66 within constant diameter portion 40a and past shoulder 28 in a similar manner as shown in FIG. 4. This positions ring member 34 midway between flanges 24 and 66. As a result, molten polymer flows around tip member 68 to purge contaminants 19 captured within annular region 36 behind downstream flange 66 and filter holes 78 for discharge through nozzle 32. The flow path of the molten polymer as indicated by arrows F, axially passes upstream flange 24 through gap 11 and flows radially inwardly into annular region 36 through gap 15. The molten polymer flows axially through annular region 36 and then radially outwardly through gap 17 to flow axially past downstream flange 66 through gap 13. The polymer then flows over tip 22b, through bore 40, and out through nozzle opening 42 of nozzle 32.

A tubular filter screen 79 can be optionally included for removing contaminants 19. Filter screen 79 is installed by separating intermediate shaft portion 22a from upstream flange 24 and slipping filter screen 79 over intermediate shaft portion 22a. Intermediate shaft portion 22a is then resecured to upstream flange 24. Filter screen 79 preferably has a pore size of 10 microns to 1000 microns with 100 microns being the most preferred. If a filter screen 79 is employed, filter holes 78 within intermediate shaft portion 22a can be enlarged to preferably about 5,000 microns. Alternatively, depending upon the application at hand, filter holes 78 can range between 2,000 microns and 10,000 microns when a filter screen 79 is used.

Referring to FIGS. 12, 13, 14 and 15, filtration apparatus 90 differs from filtration apparatus 50 in that tip member 82 includes an upstream flange 84 having a shoulder 98 and a downstream flange 86 with a series of large axial openings 86a therethrough. In addition, ring member 88 has an upstream wall 92 and a downstream wall 94 with a series of respective axial openings 92a and 94a therethrough.

In the operation of filtration apparatus 90 (FIGS. 12 and 13), when screw 16 is rotated in the direction of arrow 20 to plasticize polymer pellets within bore 38 and translated backwardly in the direction of arrow 18 to accumulate molten polymer within bore 38, the flow of molten polymer forces ring member 88 against downstream flange 86. This seals annular gap 13 as well as blocks the openings 94a in the downstream wall 94 of ring member 88. The flow path of the molten polymer as indicated by arrows F, is directed axially past upstream flange 84 through annular gap 11 and axially into annular region 62 through openings 92a in the upstream wall 92 of ring member 88. The polymer then flows radially inwardly through the filter holes 54a of radial wall 54 into annular region 36, axially through the openings 86a in downstream flange 86 and over tip 22b. Contaminants 19 are trapped behind filter holes 54a within annular region 62.

Figure 14:
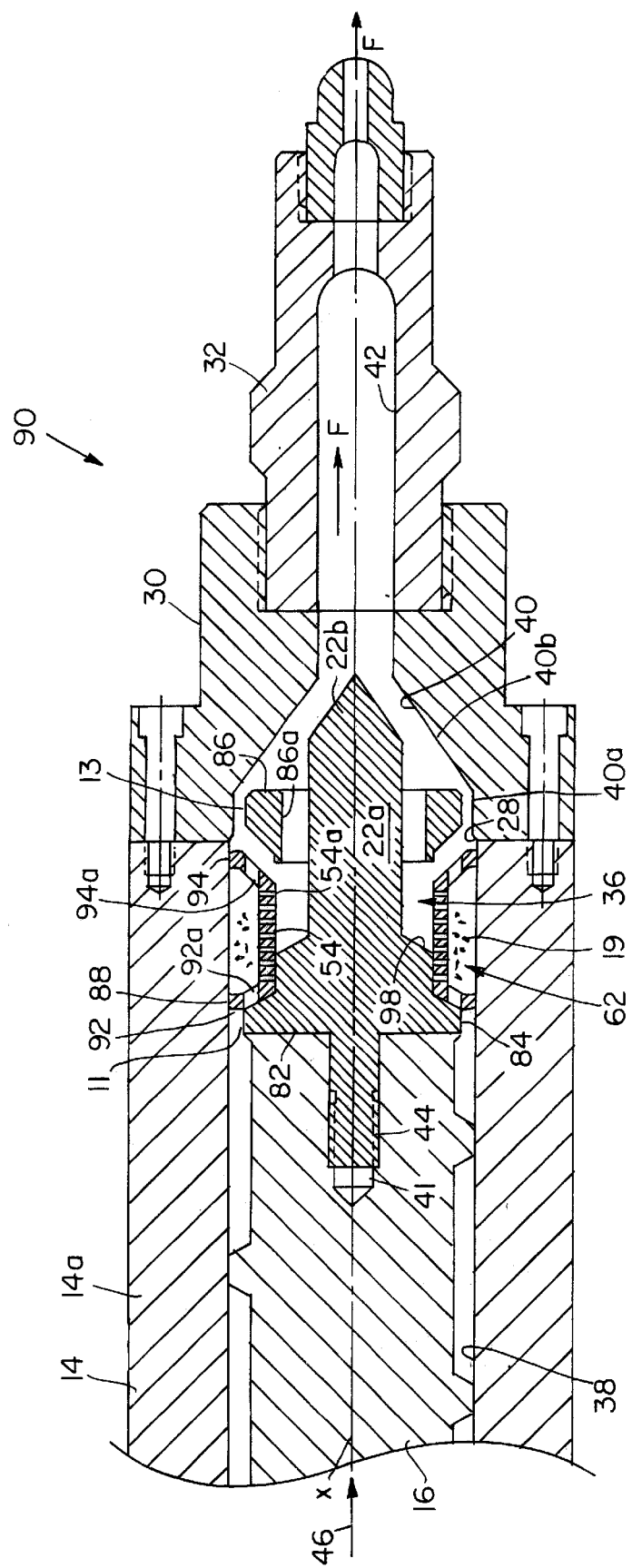
FIG. 14 is a side sectional view of the injection molding machine and filtration apparatus of FIG. 12 with the screw translated forward in a polymer injection stroke.

Referring to FIG. 14, when screw 16 is translated in the forward injection stroke for injecting a shot of molten polymer from bore 38 into a mold, as indicated by arrows F, the upstream wall 92 of ring member 88 is forced against upstream flange 84 and radial wall 54 is seated on shoulder 98. This seals gap 11 and the series of openings 92a within upstream wall 92 which prevents the backflow of molten polymer past upstream flange 84.

Figure 15:
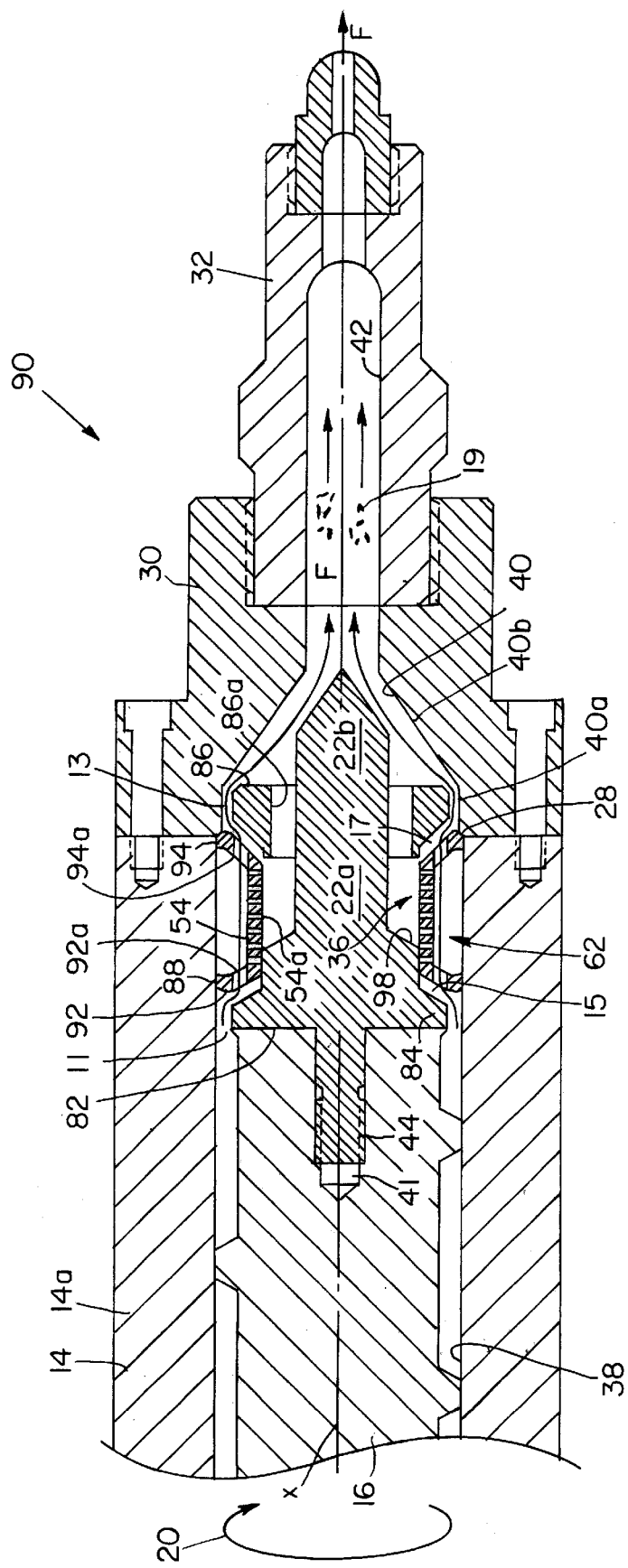
FIG. 15 is a side sectional view of the injection molding machine and filtration apparatus of FIG. 12 with the screw positioned forward for purging contaminants from the filter.

Referring to FIG. 15, when the purging of contaminants 19 from annular region 62 is necessary, screw 16 is translated forward to position ring member 88 midway between flanges 84 and 86 in the same manner previously described and then rotated. As a result, molten polymer flows around tip member 82 and axially through the annular region 62 of ring member 88 to purge and discharge contaminants 19 trapped behind filter holes 54a through nozzle 32. The flow path of the molten polymer, as indicated by arrows F, flows axially past upstream flange 84 through gap 11, radially inwardly through gap 15, axially through openings 92a in upstream wall 92 of ring member 88, axially through annular region 62, axially through openings 94a in downstream wall 94 of ring member 88, radially outwardly through gap 17, axially past downstream flange 86 through gap 13, over tip 22b, through bore 40, and out through the nozzle opening 42 of nozzle 32.

Referring to FIGS. 16–19, polymer filtration apparatus 100 includes a tip member 104 which is secured to the distal end of the screw 16 of injection molding machine 14 with a mounting shaft 44 in the same manner as with filtration apparatuses 10, 50, 70 and 90. Tip member 104 includes a ring-like washer positioned over mounting shaft 44 which forms the upstream flange 110 and a generally conical tip 22b which forms the downstream flange 120. The upstream 110 and downstream 120 flanges are separated from each other by an intermediate shaft portion 118 and each include respective annular sealing surfaces 110a and 120a which face each other and angle outwardly moving radially outward.

A slidable ring member 108 (FIGS. 16 and 17) is positioned within bore 38 between upstream 110 and downstream 120 flanges in a manner similar to ring member 34 (see FIGS. 1 and 9). Ring member 108 includes mating angled annular sealing surfaces 108a at the axial ends thereof.

Figure 18:
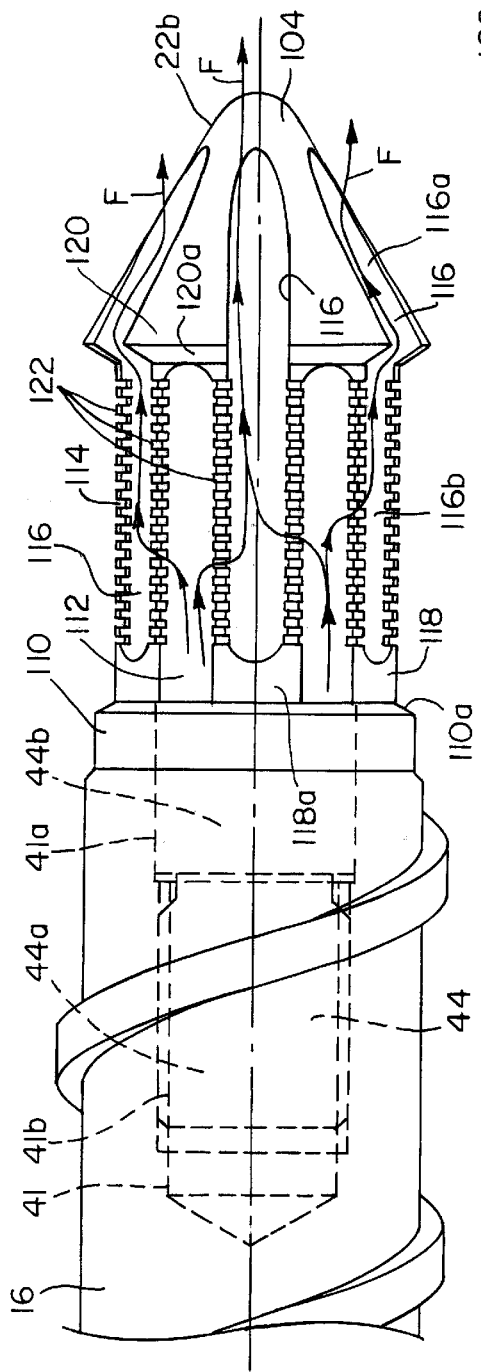
FIG. 18 is a side view of the tip member secured to the screw.
Figure 19:
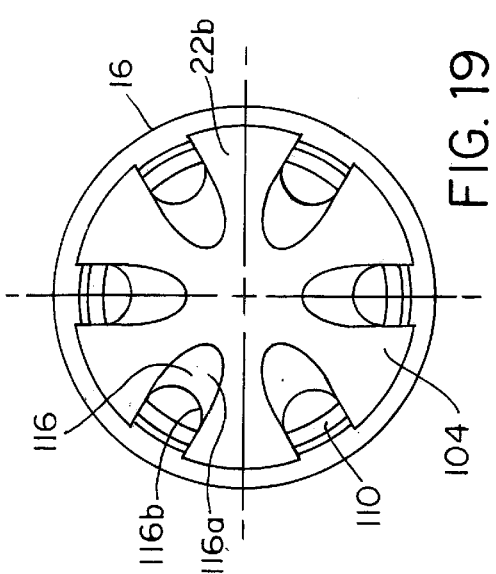
FIG. 19 is a front end view of the tip member.

Encircling the intermediate shaft portion 118 is a series of circumferentially spaced longitudinal slots 112 (FIGS. 16–18) extending between the upstream 110 and downstream 120 flanges parallel to axis X. A series of longitudinal slots 116 also encircle the intermediate shaft portion 118 and are arranged on the intermediate shaft portion 118 parallel to axis X in an alternating fashion with slots 112. The longitudinal slots 116 extend from the intermediate shaft portion 118 through downstream flange 120 and along tip 22b near the end thereof (FIGS. 18 and 19). A short upstream diameter portion 118a of the intermediate shaft portion 118 separates slots 116 from upstream flange 110. This is in contrast to slots 112 where the ends of the slots 112 abut the upstream 110 and downstream 120 flanges. Slots 112 and 116 preferably have a semicircular cross section (FIG. 17) but alternatively can have other suitable cross sections, for example, rectangular or angled.

Figure 16:
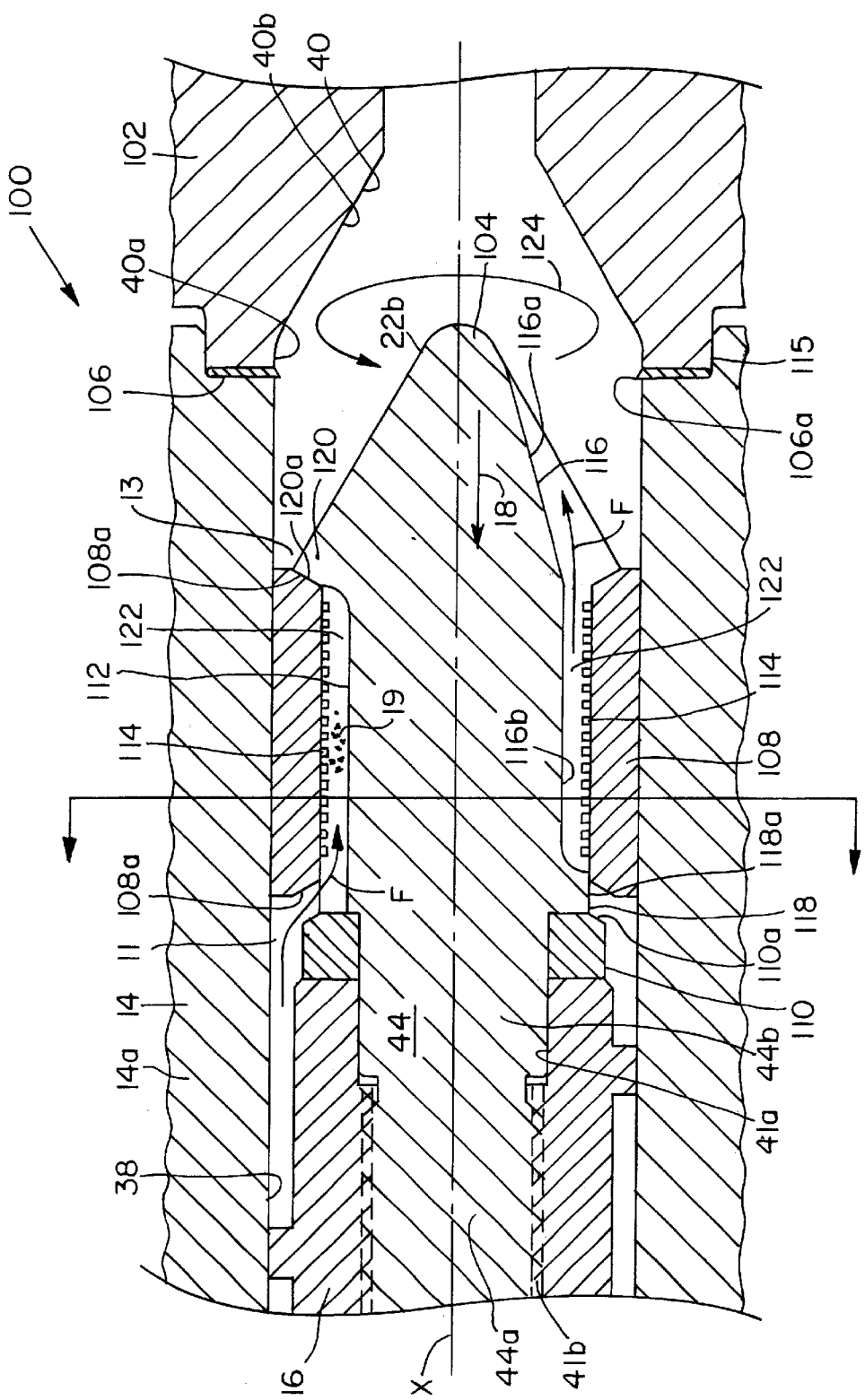
FIG. 16 is a side sectional view of the distal end of an injection molding machine including another preferred polymer filtration apparatus.
Figure 17:
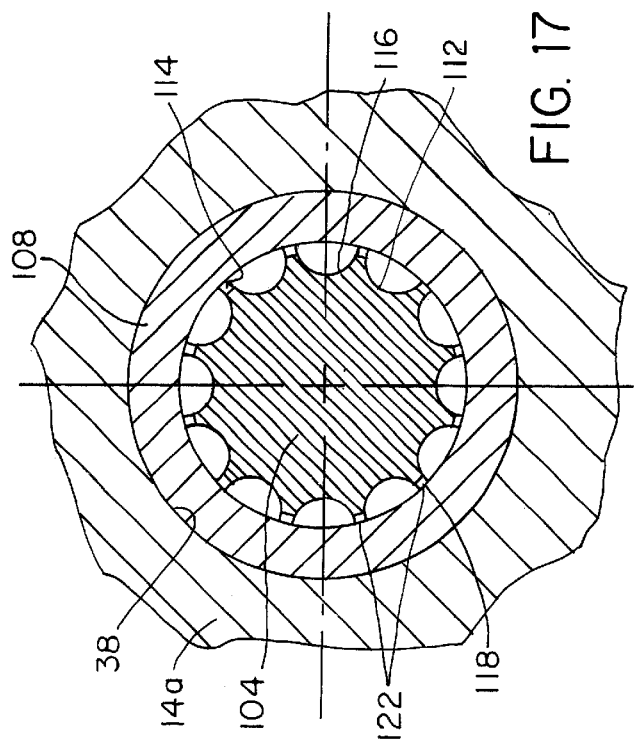
FIG. 17 is a cross-sectional view of the injection molding machine and polymer filtration apparatus of FIG. 16.

A series of longitudinal walls or ridges 122 separate slots 112 and 116 from each other. Each ridge 122 is relatively narrow and includes a series of lateral openings or slots 114 therethrough. The slots 114 within ridges 122 extend along the outer radial edge and serve as a comb-like lateral filter element for filtering polymer flowing circumferentially and laterally therethrough. As can be seen in FIGS. 16 and 17, the inner surface of ring member 108 engages the outer radial edges of the ridges 122. Consequently, the combination of ring member 108 with ridges 122 turns the slots 114 of ridges 122 into holes. In other words, ring member 108 forms the outer edge for a series of square holes. The series of filter elements formed in the ridges 122 combine to form a filter encircling the intermediate shaft portion 118.

End cap 102 (FIG. 16) is seated in a bore 115 at the end of barrel 14a with an annular ring 106 positioned therebetween. Annular ring 106 has an inner annular edge 106a which protrudes into bore 38 and acts as a shoulder or end stop to prevent travel of ring member 108 therepast.

In the operation of filtration apparatus 100 (FIG. 16), when screw 16 is rotated in the direction of arrow 124 to plasticize polymer pellets within bore 38 and translated backwardly in the direction of arrow 18 to accumulate molten polymer within bore 38, the flow of molten polymer forces ring member 108 against downstream flange 120, with sealing surfaces 108a and 120a forming a seal therebetween. This seals the annular gap 13 surrounding downstream flange 120. As a result, molten polymer flows through annular gap 11 (as indicated by arrows F) and is directed radially inwardly into the longitudinal slots 112 within intermediate shaft portion 118, then longitudinally along slots 112, and next, circumferentially sideways through slots 114 of ridges 122 into the slots 116 for removing contaminants 19 (see FIGS. 16 and 18) which accumulate or are trapped within longitudinal slots 112. The flow path of the molten polymer continues longitudinally down slots 116 through downstream flange 120 and past tip 22b. As can be seen in FIG. 16, ring member 108 covers a portion of the short diameter portion 118a on intermediate shaft portion 118 and therefore prevents the polymer from flowing directly into slots 116 from annular gap 11.

Figure 20:
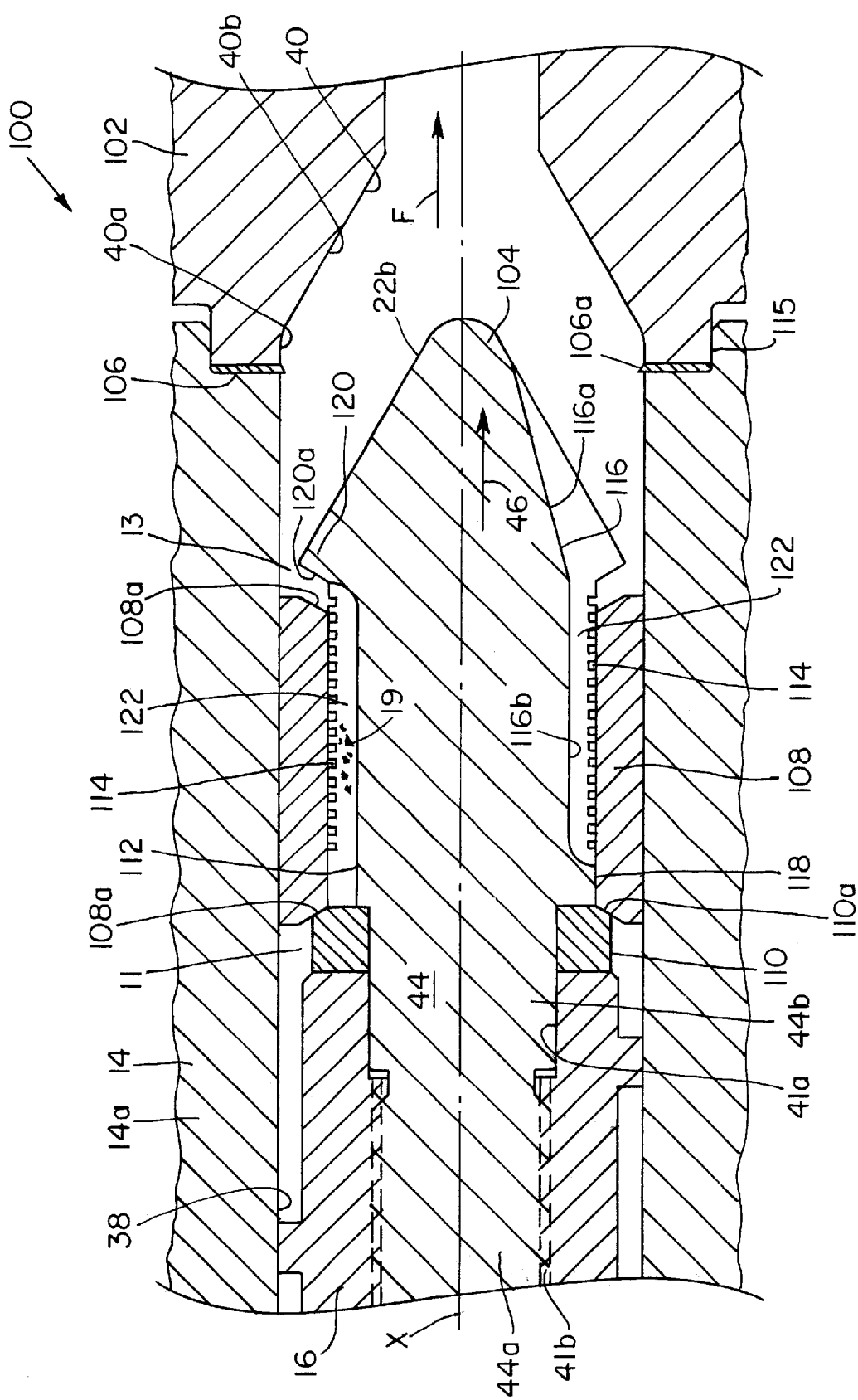
FIG. 20 is a side sectional view of the injection molding machine and polymer filtration apparatus of FIG. 16 in which the screw is being translated forward in a polymer injection stroke.

Referring to FIG. 20, when screw 16 is translated in the forward injection stroke as indicated by arrow 46 for injecting a shot of molten polymer from bore 38 into a mold (as indicated by arrows F), ring member 108 is forced against upstream flange 110, with sealing surfaces 108a and 110a forming a seal therebetween. This seals annular gap 11 and prevents back flow of molten polymer past upstream flange 110.

Figure 21:
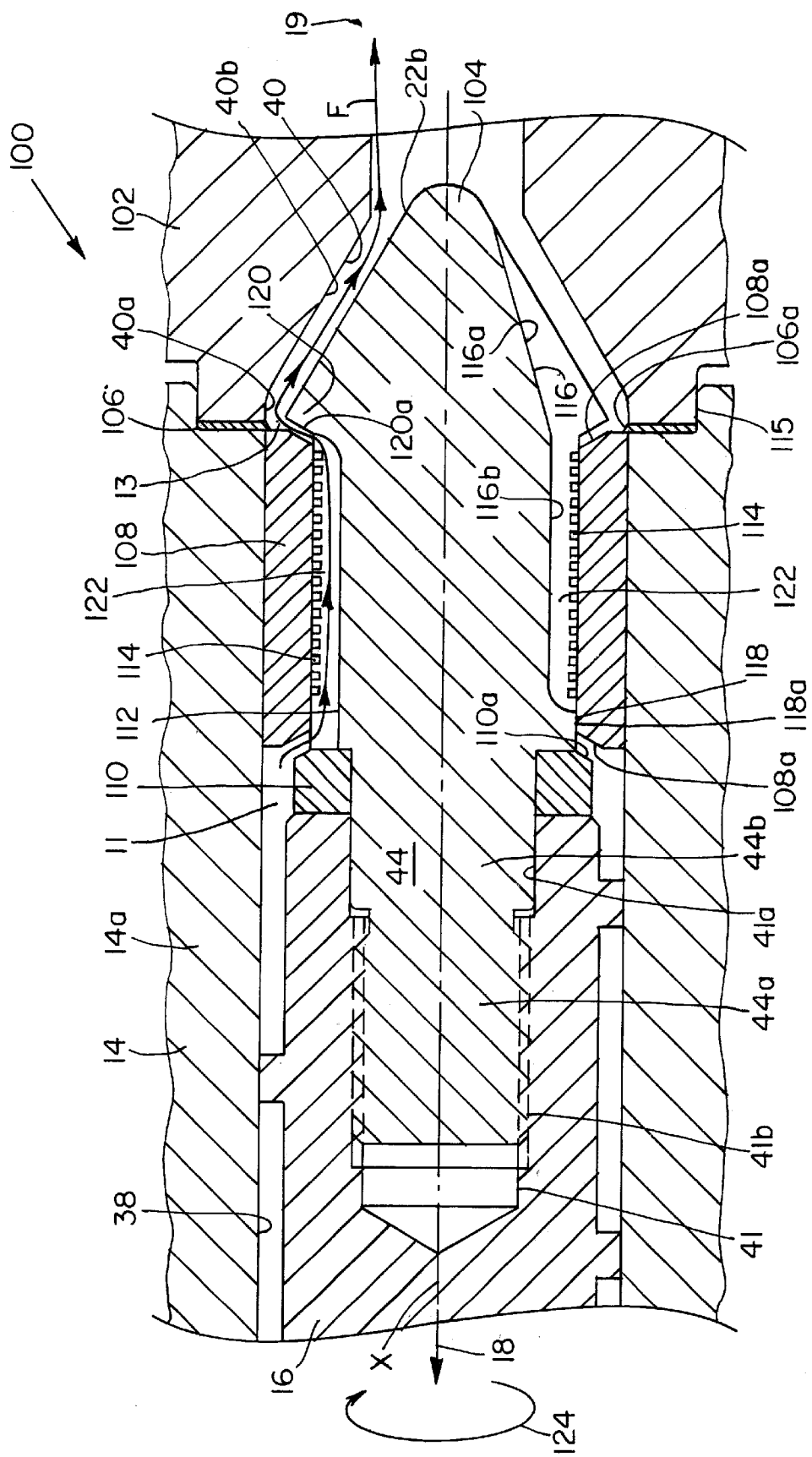
FIG. 21 is a side sectional view of the injection molding machine and polymer filtration apparatus of FIG. 16 in which the screw is positioned forward for purging contaminants from the filter.

Referring to FIG. 21, when purging of contaminants 19 is necessary, screw 16 is translated forward to position downstream flange 120 past the upstream surface of the shoulder formed by annular ring 106. This positions ring member 108 approximately midway between flanges 110 and 120. FIG. 21 depicts ring member 108 slightly closer to downstream flange 120 but the position of ring member 108 may vary depending upon the situation at hand. As a result, molten polymer flows (as indicated by arrows F) past upstream flange 110 through annular gap 11 and is directed radially inwardly into the longitudinal slots 112. The molten polymer then flows longitudinally along slots 112, radially outwardly over downstream flange 120, through annular gap 13 and finally around tip 22b to purge contaminants 19 captured within slots 112 for discharge from bore 40 through the nozzle. Flow of molten polymer through slots 116 is substantially prevented because ring member 108 engages the short diameter portion 118a of intermediate shaft portion 118 and blocks flow directly into slots 116 from annular gap 11.

The slots 114 through ridges 122 are preferably rectangular but alternatively, may be curved or angled, or instead may be holes therethrough. FIGS. 17 and 19 depict six slots 112 and six slots 116 encircling tip member 104. This number may vary depending upon the diameter of intermediate shaft portion 118 and the width of the slots 112/116. The depth of slots 112/116 also depends upon the diameter of intermediate shaft portion 118. Although slots 112/116 are shown to extend parallel to axis X, alternatively, slots 112/116 may be curved or spiraled. In addition, although tip member 104 is depicted to be formed of two pieces, alternatively, tip member 104 may have more than or less than two pieces. The diameter of upstream flange 110 has been shown to be less than the diameter of screw 16. However, the diameter of the upstream flange may vary to suit the situation at hand. Also, the end of screw 16 may be employed to form the upstream flange 110 instead of employing a ring-like washer. Although an annular ring 106 is employed for forming an end stop for ring member 108, the end cap 102 may be formed with a shoulder that acts as the end stop. Ring member 108 may be keyed to tip member 104 so that ring member 108 rotates with tip member 104. Alternatively, ring member 108 and tip member 104 may have interlocking surfaces, for example interlocking notches to achieve the same result. Slots 114 within ridges 122 are typically spaced annular grooves which are formed by turning tip member 104 on a lathe. Alternatively, slots 114 may be formed by making a spiral or helical groove. Typically, slots 114 are about 500 microns wide. For filtering smaller particles, ridges 122 may be formed to accept filter screens, for example, within a longitudinal notch. In addition, ridges 122 may be replaced by removable filter elements containing filter screens.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, features depicted in filtration apparatuses 10, 50, 70, 90, and 100 can be interchanged. In addition, filtration apparatuses 10, 50, 70, 90, and 100 can be installed within existing injection molding machines or included within new equipment. Furthermore, although shoulder 28 of end cap 30 and annular ring 106 have been shown and described as being employed as end stops for preventing downstream travel of the ring members, alternatively, other suitable methods of providing an end stop can be employed. For example, a shoulder can be machined within bore 38, a sleeve can be fitted within bore 38, or small protrusions can be formed or installed within bore 38. Also, although the ring members are preferably positioned midway between the flanges of the tip members during purging, during actual use, the ring members may sometimes be slightly closer to one of the flanges. Finally, although only filtration apparatus 70 has been shown with a filter screen 79, a filter screen can be employed in filtration apparatuses 10, 50, 90, and 100 if desired.

What is claimed is:

1. A method of forming a filtration apparatus for an injection molding machine, the injection molding machine including a screw housed within a bore for generating molten polymer, the method comprising the steps of:

axially extending a tip member from the screw, the tip member having radially extending upstream and downstream flanges positioned axially apart from each other;

encircling a filter around the tip member for filtering the molten polymer;

slidably positioning an annular ring member within the bore and encircling the tip member between the upstream and downstream flanges, the ring member capable of slidably engaging the downstream flange for directing the molten polymer through the filter as well as slidably engaging the upstream flange for preventing back flow of the molten polymer past the upstream flange; and positioning an end stop within the bore capable of engaging and preventing movement of the ring member past the end stop while allowing the downstream flange of the tip member to be translated forwardly therepast to simultaneously space the upstream and downstream flanges apart from the ring member for allowing the molten polymer to bypass the filter for purging contaminants filtered from the molten polymer.

2. The method of claim 1 further comprising the steps of:

providing an intermediate shaft portion between the upstream and downstream flanges;

forming a series of first recesses in the intermediate shaft portion, each extending longitudinally along the intermediate shaft portion between the flanges; and forming a series of second recesses in the intermediate shaft portion, each starting from a position spaced from the upstream flange and extending longitudinally along the intermediate shaft portion and through the downstream flange, each first and second recess being laterally separated from each other by a filter element of the filter for filtering molten polymer flowing from the first recesses into the second recesses.

3. The method of claim 2 further comprising the step of separating each first recess from a second recess by a ridge, each ridge having openings therethrough forming said filter element.

4. The method of claim 3 further comprising the step of shaping the downstream flange to be generally conical, the downstream flange becoming narrower in a downstream direction.

5. The method of claim 4 further comprising the step of mounting an annular member at an upstream end of the intermediate shaft portion to form the upstream flange.

6. The method of claim 1 further comprising the step of forming the end stop from an annular ring extending into the bore.

7. The method of claim 1 further comprising the step of mounting the tip member to the screw.

8. A method of forming a filtration apparatus for an injection molding machine, the injection molding machine including a screw housed within a bore for generating molten polymer, the method comprising the steps of:

axially extending a tip member from the screw, the tip member having radially extending upstream and downstream flanges positioned axially apart from each other with an intermediate shaft portion therebetween, the intermediate shaft portion having a series of first recesses, each extending longitudinally along the intermediate shaft portion between the flanges, and a series of second recesses, each starting from a position spaced from the upstream flange and extending longitudinally along the intermediate shaft portion and through the downstream flange, each first and second recess being laterally separated from each other by a filter element of a filter encircling the tip member for filtering the molten polymer;

slidably positioning an annular ring member within the bore and encircling the tip member between the upstream and downstream flanges, the ring member capable of slidably engaging the downstream flange for directing the molten polymer through the filter from the first recesses into the second recesses, as well as slidably engaging the upstream flange for preventing back flow of the molten polymer past the upstream flange; and positioning an end stop within the bore capable of engaging and preventing movement of the ring member past the end stop while allowing the downstream flange of the tip member to be translated forwardly therepast to simultaneously space the upstream and downstream flanges apart from the ring member for allowing the molten polymer to bypass the filter for purging contaminants filtered from the molten polymer.

9. A filtration apparatus for an injection molding machine, the injection molding machine including a screw housed within a bore for generating molten polymer, the filtration apparatus comprising:

a tip member extending axially from the screw, the tip member having radially extending upstream and downstream flanges positioned axially apart from each other;

a filter encircling the tip member for filtering the molten polymer;

an annular ring member encircling the tip member and slidably positioned within the bore between the upstream and downstream flanges, the ring member capable of slidably engaging the downstream flange for directing the molten polymer through the filter as well as slidably engaging the upstream flange for preventing back flow of the molten polymer past the upstream flange; and an end stop positioned within the bore capable of engaging and preventing movement of the ring member past the end stop while allowing the downstream flange of the tip member to be translated forwardly therepast to simultaneously space the upstream and downstream flanges apart from the ring member for allowing the molten polymer to bypass the filter for purging contaminants filtered from the molten polymer.

10. The filtration apparatus of claim 9 in which the tip member includes an intermediate shaft portion between the upstream and downstream flanges, the intermediate shaft portion having a series of first recesses, each extending longitudinally along the intermediate shaft portion between the flanges, and a series of second recesses, each starting from a position spaced from the upstream flange and extending longitudinally along the intermediate shaft portion and through the downstream flange, each first and second recess being laterally separated from each other by a filter element of the filter for filtering molten polymer flowing from the first recesses into the second recesses.

11. The filtration apparatus of claim 10 in which each first recess is separated from a second recess by a ridge, each ridge having openings therethrough forming said filter element.

12. The filtration apparatus of claim 11 in which the openings are slots along an outer edge of said ridge.

13. The filtration apparatus of claim 10 in which the downstream flange is generally conical shaped, the downstream flange becoming narrower moving in a downstream direction.

14. The filtration apparatus of claim 13 in which the upstream flange comprises an annular member mounted at an upstream end of the intermediate shaft portion.

15. The filtration apparatus of claim 9 in which the end stop comprises an annular ring extending into the bore.

16. The filtration apparatus of claim 9 in which the tip member is mounted to the screw.

17. A filtration apparatus for an injection molding machine, the injection molding machine including a screw housed within a bore for generating molten polymer, the filtration apparatus comprising:

a tip member extending axially from the screw, the tip member having radially extending upstream and downstream flanges positioned axially apart from each other with an intermediate shaft portion therebetween, the intermediate shaft portion having a series of first recesses, each extending longitudinally along the intermediate shaft portion between the flanges, and a series of second recesses, each starting from a position spaced from the upstream flange and extending longitudinally along the intermediate shaft portion and through the downstream flange, each first and second recess being laterally separated from each other by a filter element of a filter encircling the intermediate shaft portion for filtering the molten polymer;

an annular ring member encircling the tip member and slidably positioned within the bore between the upstream and downstream flanges, the ring member capable of slidably engaging the downstream flange for directing the molten polymer through the filter from the first recesses into the second recesses, as well as slidably engaging the upstream flange for preventing back flow of the molten polymer past the upstream flange; and an end stop positioned within the bore capable of engaging and preventing movement of the ring member past the end stop while allowing the downstream flange of the tip member to be translated forwardly therepast to simultaneously space the upstream and downstream flanges apart from the ring member for allowing the molten polymer to bypass the filter for purging contaminants filtered from the molten polymer.

18. The filtration apparatus of claim 17 in which each first recess is separated from a second recess by a ridge, each ridge having openings therethrough forming said filter element.

19. The filtration apparatus of claim 18 which the openings are slots along an outer edge of said ridge.

20. The filtration apparatus of claim 17 in which the downstream flange is generally conical shaped, the downstream flange becoming narrower moving in a downstream direction.

21. The filtration apparatus of claim 20 in which the upstream flange comprises an annular member mounted at an upstream end of the intermediate shaft portion.

22. The filtration apparatus of claim 1 in which the end stop comprises an annular ring extending into the bore.

23. The filtration apparatus of claim 1 in which the tip member is mounted to the screw.

* * * * *

UNITED STATES PATENT AND TRADEMARK OFFICE
CERTIFICATE OF CORRECTION

PATENT NO.    : 6,270,703 B1                                      Page 1 of 1
DATED         : August 7, 2001
INVENTOR(S)   : Paul D. Wildman and Delano B. Trott It is certified that error appears in the above-identified patent and that said Letters Patent is hereby corrected as shown below:

<u>Column 11, claim 4,</u>
Line 64, delete "claim 3" and insert -- claim 2 --.

Signed and Sealed this

Second Day of April, 2002

*Attest:*

*Attesting Officer*

JAMES E. ROGAN
*Director of the United States Patent and Trademark Office*